(12) United States Patent
Molitor et al.

(10) Patent No.: US 9,395,228 B2
(45) Date of Patent: Jul. 19, 2016

(54) DEVICE AND METHOD FOR MEASURING THE LEVEL OF A LIQUID WITHIN A CONTAINER

(71) Applicant: TRUMA GERAETETECHNIK GMBH & CO. KG, Putzbrunn (DE)

(72) Inventors: Thomas Molitor, Putzbrunn (DE); Frank Ibach, Grafing (DE)

(73) Assignee: Truma Geraetetechnik GmbH & Co. KG, Putzbrunn (DE)

( * ) Notice: Subject to any disclaimer, the term of this patent is extended or adjusted under 35 U.S.C. 154(b) by 452 days.

(21) Appl. No.: 13/768,608

(22) Filed: Feb. 15, 2013

(65) Prior Publication Data

US 2014/0230542 A1 Aug. 21, 2014

(51) Int. Cl.
*G01F 23/28* (2006.01)
*G01F 23/296* (2006.01)

(52) U.S. Cl.
CPC ............ *G01F 23/28* (2013.01); *G01F 23/2961* (2013.01); *G01F 23/2965* (2013.01)

(58) Field of Classification Search
CPC .................................................. G01F 23/296
USPC ........................................................ 73/290 V
See application file for complete search history.

(56) References Cited

U.S. PATENT DOCUMENTS

| | | | | |
|---|---|---|---|---|
| 4,193,010 A | * | 3/1980 | Kompanek | G01F 23/2967 310/321 |
| 4,280,126 A | * | 7/1981 | White | G01F 23/2965 340/621 |
| 4,853,694 A | * | 8/1989 | Tomecek | G01F 23/2962 340/621 |
| 5,730,025 A | | 3/1998 | Getman et al. | |
| 5,755,136 A | * | 5/1998 | Getman | G01F 23/2961 340/618 |
| 6,536,275 B1 | * | 3/2003 | Durkee | G01F 23/2962 73/290 R |
| 7,770,447 B2 | * | 8/2010 | Dockendorff et al. | 73/290 V |
| 2004/0035208 A1 | | 2/2004 | Diaz et al. | |
| 2008/0156577 A1 | * | 7/2008 | Dietz | G10K 11/30 181/176 |
| 2009/0019929 A1 | * | 1/2009 | Kingdon | G01F 23/2968 73/290 V |

FOREIGN PATENT DOCUMENTS

| | | |
|---|---|---|
| DE | 195 38 696 A1 | 4/1997 |
| DE | 103 31 044 A1 | 2/2005 |
| DE | 20 2011 003 126 U1 | 5/2011 |
| EP | 1 679 495 A2 | 7/2006 |
| GB | 2126342 A | 3/1984 |
| WO | 8905442 A1 | 6/1989 |
| WO | 2012113776 A1 | 8/2012 |

\* cited by examiner

*Primary Examiner* — Hezron E Williams
*Assistant Examiner* — Mark A Shabman
(74) *Attorney, Agent, or Firm* — McNees Wallace & Nurick LLC

(57) ABSTRACT

A device for measuring the level of a liquid within a container, in particular the level of liquid gas, comprises a housing and a piezoelectric element adapted for generating vibrations when energized. A coupling pad is provided which is bonded to the piezoelectric element for transmitting the vibrations to a surface of the container. Further, a non-tilting element is provided which surrounds the coupling pad. A method for measuring the level of liquid within a container uses a piezoelectric element for generating vibrations which are transmitted into the shell of the container. An analyzing strategy is used which distinguishes between normal post-pulse oscillations of the piezoelectric element after a measurement was triggered, and extended post-pulse oscillations which are the result of echoed oscillations in the shell of the container.

19 Claims, 5 Drawing Sheets

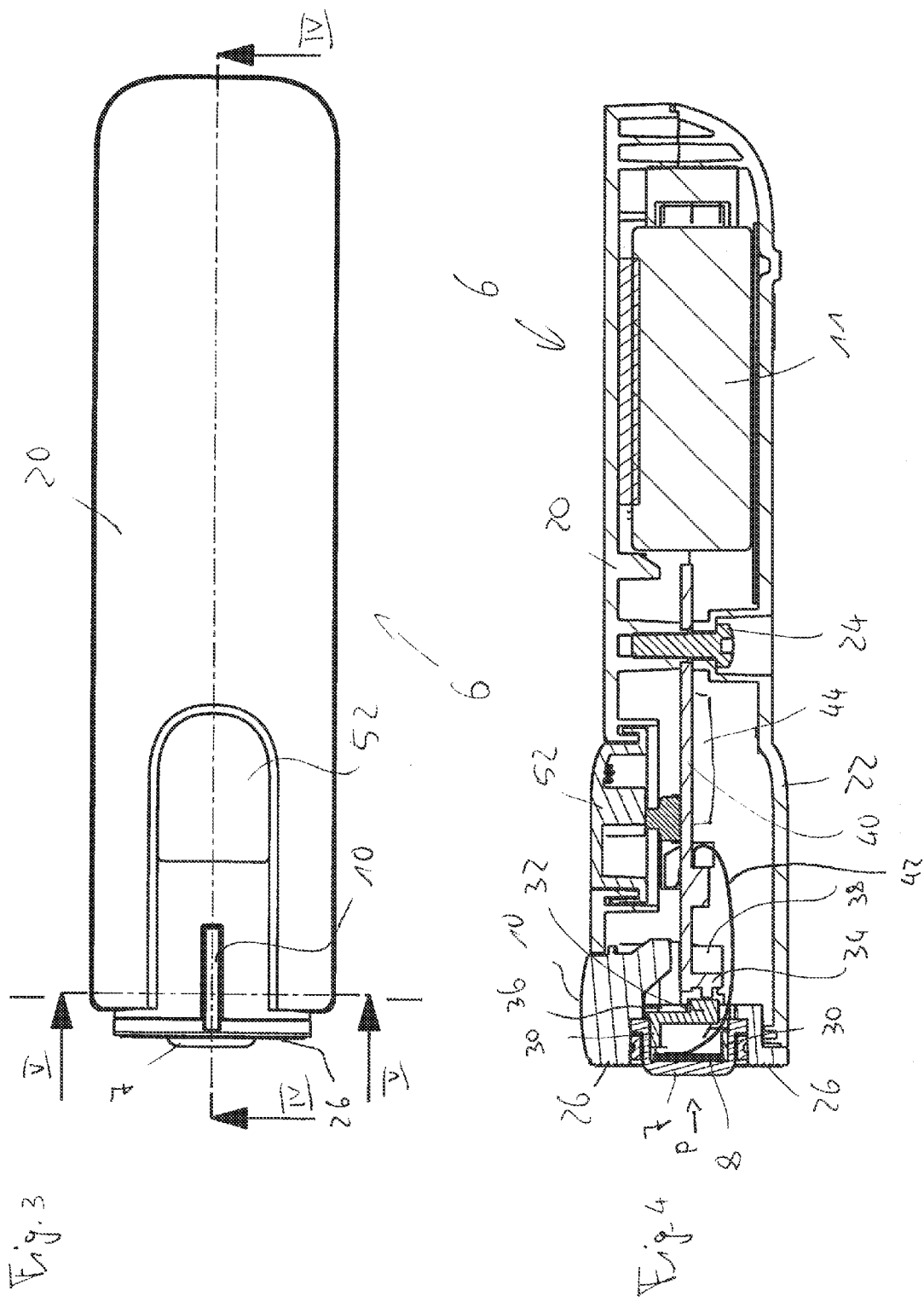

DEVICE AND METHOD FOR MEASURING THE LEVEL OF A LIQUID WITHIN A CONTAINER

The invention relates to a device for measuring the level of a liquid within a container, in particular the level of liquid gas. The invention in particular relates to a handheld device which is energized by a small battery and allows determining the level of liquid gas within a container which is used for camping or barbecue. The invention further relates to a method of measuring the level of liquid within a container.

BACKGROUND OF THE INVENTION

Devices for determining the level of a liquid within a container are well-known in the art. Examples can be found in GB 2 126 342 or WO 2012/113776. These devices comprise a piezoelectric element which is energized so as to generate vibrations. These vibrations are transmitted into the wall of the container containing the liquid of which the level is to be determined. If the device is pressed against the wall of the container at a height which is below the level of the liquid, oscillations generated within the container by the vibrations propagate through the liquid. These oscillations are reflected at the inner wall of the container at a point opposite to where the measuring device introduced the vibrations into the wall of the container. The reflected oscillations are received by the piezoelectric element and result in a voltage which is generated within the piezoelectric element. If the device is pressed against the container at a height which is above the level of the liquid, oscillations generated in the interior of the container by the vibrations propagate through a space which is filled with gas. As the gas dampens these oscillations, hardly any reflected oscillations will reach the wall where the measuring device is placed.

The voltage which is generated within the piezoelectric element after triggering a measurement is a signal which is indicative of the nature of the space behind the wall where the device is pressed against the container, allowing to distinguish between a space filled with gas or filled with a liquid. Depending on the signal, the device can then indicate to a user whether or not liquid is present at the level at which the device was pressed against the container.

While these devices are generally capable of correctly identifying whether or not a liquid is present within the container at the height where the device is being pressed against the wall of the container, there are situations where the accuracy of the measurement is not sufficient.

The object of the invention is to improve the known devices and methods such that the accuracy of the measurement is increased.

BRIEF DESCRIPTION OF THE INVENTION

In order to achieve this object, the invention provides a device for measuring the level of a liquid within a container, comprising a housing and a piezoelectric element adapted for generating vibrations when energized. Further, a coupling pad is provided which is bonded to the piezoelectric element for transmitting the vibrations to a surface of the container. Still further, a non-tilting element is provided which surrounds the coupling pad. It has been found out that the accuracy of the measurement can be significantly increased if it is ensured that the measuring device is applied to the outer surface of the container in the correct orientation, in particular perpendicularly with respect to the outer surface. This is due to a deeper understanding of what happens within the container when the measuring device is being pressed against the wall of the container. Research of the applicant revealed that there in fact are two different types of oscillations which occur after the vibrations of the piezoelectric element are transmitted into the wall of the container. There is a first type of oscillations which propagates within the shell (meaning: within the wall) of the container in all directions from the point where the measuring device is applied, like any surface acoustic wave. These oscillations are transmitted within the material of the shell, which typically is steel. After having travelled in a peripheral direction through the entire shell, these oscillations can be sensed as an echo by the measuring device if they propagate through a section of the container where no liquid is present. If liquid is present, it has a dampening effect on the shell and the oscillations propagating therein such that no echo or at least no measurable echo will reach the measuring device. A second type of oscillations propagates directly from the point where the measuring device is pressed against the shell of the container, into the container and through the inner space of the container towards the opposite side where it is being reflected, and back to the point where the measuring device is pressed against the container. The second type of oscillations propagates within the material which is present in the container, in particular with the section at which the measuring device is pressed against the container. If the container in this section is filled with a liquid, the oscillations towards the opposite side of the shell and the reflected oscillations transmit fairly well so that the reflected oscillations can be sensed by the measuring device. If gas is present in the space between the point where the vibrations are transmitted into the shell of the container and the opposite portion of the wall, these oscillations are damped such that no reflection can be sensed by the measuring device.

Applying the measuring device to the wall of the container with an oblique orientation can have a significant impact on the measurement, in particular if the measuring device is applied slightly above the level of the liquid within the container but orientated downwardly so that the forward end of the measuring device points into the liquid. Part of the oscillations of the second type will enter into the liquid and then propagate through the liquid towards the opposite side, will be reflected there and propagate back through the liquid towards the side of the shell where the vibrations were generated. These reflections will arrive at the measuring device with a strength and a delay which is very similar to the reflected oscillations received if the vibrations where introduced into the shell of the container at a height below the level of the liquid, thus resulting in a false measurement. The non-tilting element is a simple yet efficient means for ensuring that a user of the measuring device triggers a measurement only with a correctly oriented device.

According to a preferred embodiment of the invention, the coupling pad is chemically bonded to the piezoelectric element such that an inseparable connection is formed. Such strong connection between the coupling pad and the piezoelectric element assists in transmitting the vibrations generated in the piezoelectric element into the coupling pad and finally into the shell of the container.

According to a preferred embodiment, the coupling pad is formed from polyurethane. This offers the advantage that the material from which the coupling pad is formed can be cured at low temperatures, in particular at temperatures which are below 150° C. and more preferably below 120° C. Respecting these temperature limits ensures that the piezoelectric element is not heated to a temperature above 50 percent of the Curie temperature of the piezoelectric material, thereby maintaining the piezoelectric properties.

Preferably, an activator is used for applying the polyurethane to the piezoelectric element. The activator assists in achieving a strong chemical bond to the piezoelectric element.

According to a preferred embodiment, the coupling pad is formed from silicone. Silicone combines superior properties both regarding the transmittal of the vibrations and resistance to wear.

Preferably, a polymeric primer is being used for applying the silicone to the piezoelectric element. The primer enters into a mechanical connection with the molecules of the silicone so that an inseparable connection with the piezoelectric element is formed.

Preferably, the silicone has a cross-linking temperature which is below 150° C. Here again, a temperature is being used which ensures that the piezoelectric properties of the piezoelectric elements are not affected by the temperature to which the piezoelectric element is exposed when the coupling pad is being formed.

According to a preferred embodiment, the coupling pad and the piezoelectric element are mounted in a holder such that a prefabricated unit is formed. This simplifies the process of mounting the measuring device.

According to a preferred embodiment, the unit is mounted displaceably in the housing and cooperates with an electric switch for triggering a measurement. This arrangement allows to automatically trigger the measurement by applying the measuring device with the necessary pressure at the outer wall of the container.

Preferably, a mechanical stop is provided which limits the maximum displacement of the unit. The mechanical stop ensures that the electric switch cannot be damaged if a user excessively presses the measuring device against the container.

According to a preferred embodiment, the unit comprises a holding sleeve which accommodates the piezoelectric element and holds the coupling pad such that an edge portion of the coupling pad is mechanically connected to the holding sleeve at the end of the holding sleeve which is opposite the piezoelectric element. With this configuration, the coupling pad can be formed in a sleeve-like manner and assist in providing a mechanical seal between the prefabricated, displaceable unit and the housing which prevents dust from entering into the housing.

According to a preferred embodiment, the unit is preassembled with the non-tilting element. This again simplifies the mounting process.

Preferably, a measuring electronics is used for evaluating a measuring signal obtained from the piezoelectric element, with a low-pass filter being incorporated into the measuring electronics or implemented in the software. The low-pass filter allows to very effectively distinguish between echoed oscillations of the first type or reflected oscillations of the second type which are sensed by the piezoelectric element.

According to a preferred embodiment, the non-tilting element is formed in one piece with a signal element for displaying the result of the measurement. This allows providing a compact design and avoids having to mount a separate signal element to the measuring device.

Preferably, the non-tilting element is formed from a transparent plastics material. This allows using light-emitting diodes in the interior of the measuring device, the light of which then is clearly visible at the outside of the device. Further, additional features such as a flash light can be incorporated into the measuring device.

According to a preferred embodiment, the piezoelectric element comprises two electrical contacts at the same surface. This results in one of the surfaces of the piezoelectric element being free from any contact so that the coupling pad can be reliably bonded thereto over the entire surface without any interruptions.

Preferably, a conductor foil is used for contacting the piezoelectric element. The conductor foil is particularly suitable for establishing the electrical contact to the displaceable unit formed from the piezoelectric element and the coupling pad.

The above mentioned object is also achieved with a method for measuring the level of liquid within a container wherein a piezoelectric element is used for generating vibrations which are transmitted into the shell of the container, with an analyzing strategy which distinguishes between normal post-pulse oscillations of the piezoelectric element after a measurement was triggered, and extended post-pulse oscillations which are the result of echoed oscillations in the shell of the container. This allows increasing the accuracy of the measurement under conditions where the measuring device is placed at the shell of a container only slightly above the surface of an amount of liquid container therein.

BRIEF DESCRIPTION OF THE DRAWINGS

The invention will now be described with reference to the accompanying drawings. In the drawings, FIG. 1 schematically shows a measuring device applied to a container.

FIG. 3 shows the measuring device of FIG. 2 in a top view.

FIG. 4 shows a cross-section along line IV-IV of FIG. 3.

DETAILED DESCRIPTION OF THE INVENTION

Figure 1:
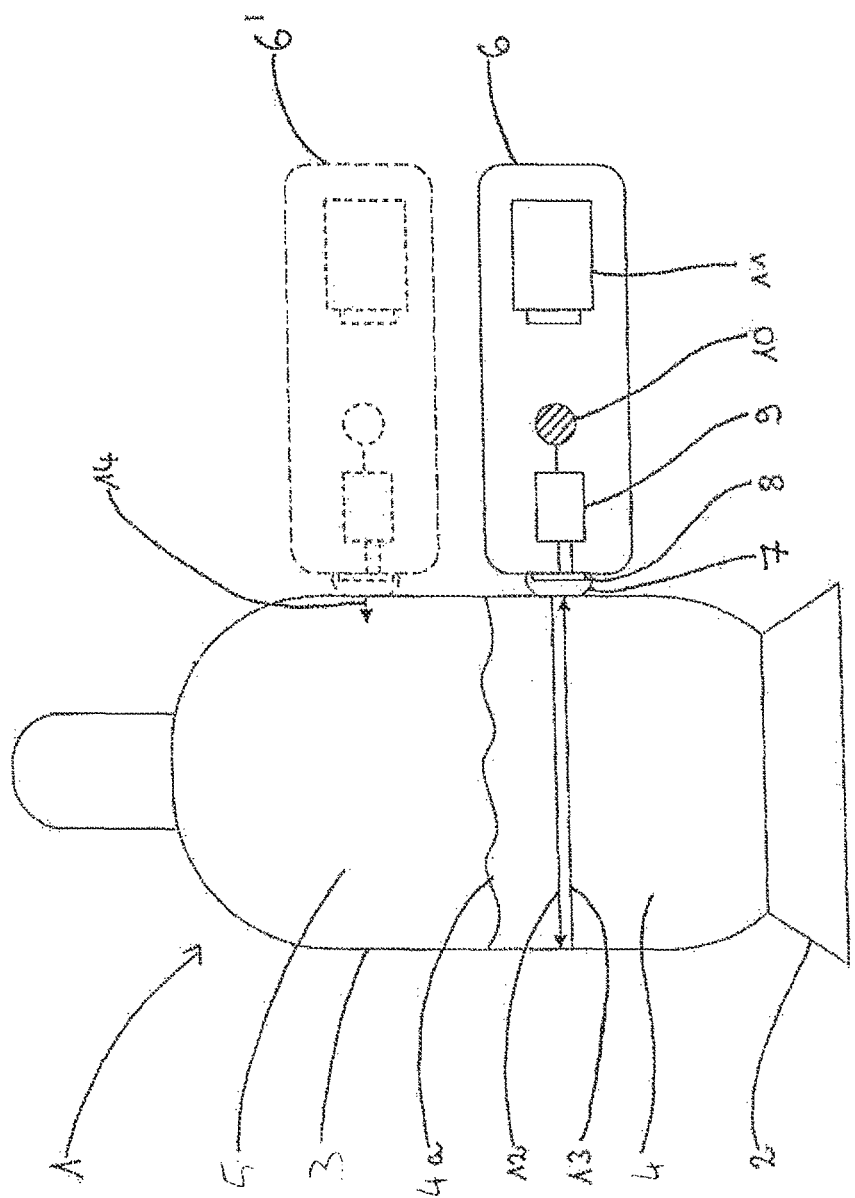
Figure 2:
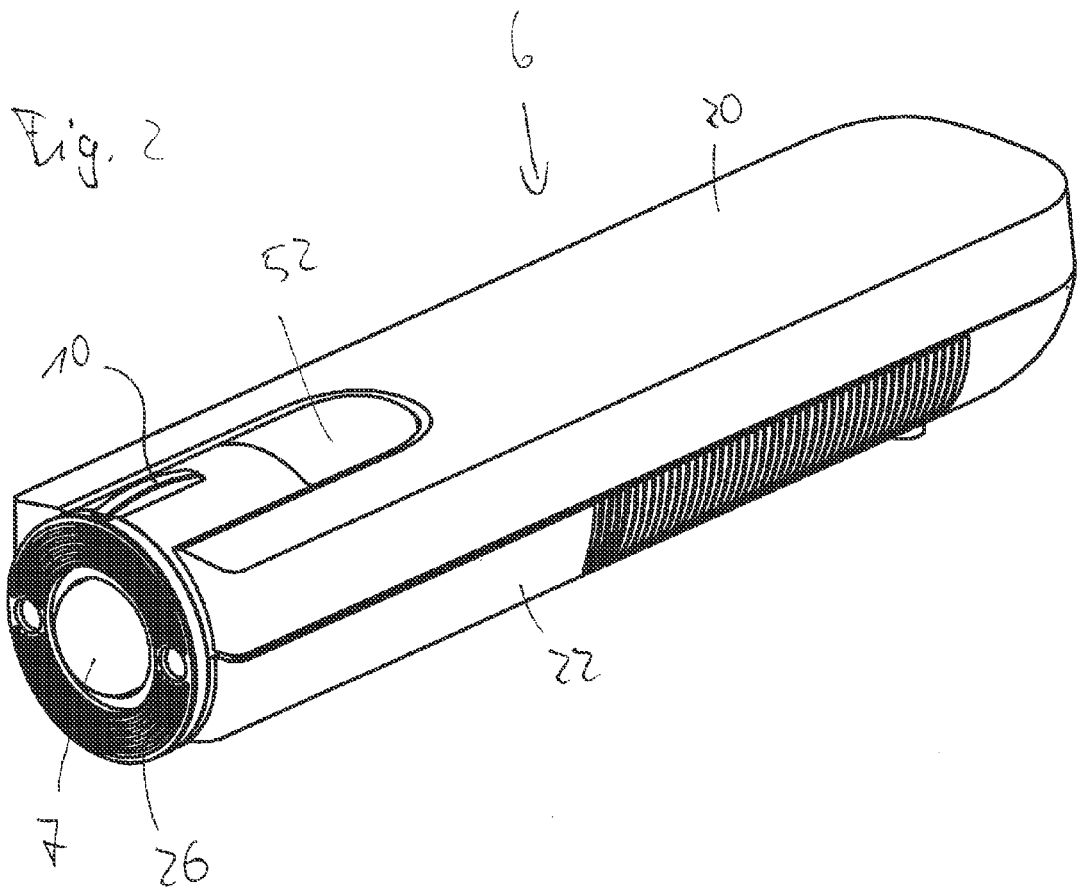
FIG. 2 shows a measuring device in a perspective view.
Figure 5:
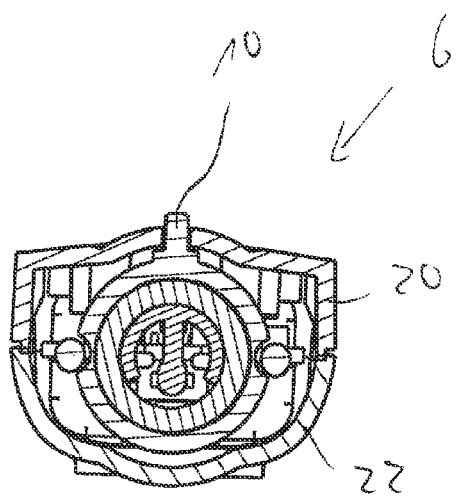
FIG. 5 shows a cross-section along line V-V of FIG. 3.

In FIG. 1, a container 1 for a liquid is shown, which is here in the form of a bottle containing liquefied gas as is used for heating and cooking in mobile homes or for barbecue. The container comprises a base 2 and a shell 3 which is typically made from metal. In the interior of container 1, a certain amount of a liquid, here liquefied gas 4, is contained. The upper surface of the liquid which represents the level up to which the container is filled, is marked with reference numeral 4a. Above upper surface 4a, the space within the container is filled with a gas which here is a vapor formed from vaporized liquid gas 4. Depending from the nature of the liquid contained in the container, this space 5 could also be filled with air.

Reference numeral 6 designates a measuring device which comprises a coupling pad 7, a piezoelectric element 8 and a control electronics 9. Further, a signal element 10 is shown which can display the result of a measurement. Finally, an energy source 11, in particular a battery, is shown which provides the necessary electric energy for conducting a measurement.

For conducting a measurement, measuring device 6 is pressed with coupling pad 7 against the outer surface of shell 3. After triggering a measurement, the control electronics 9 apply a voltage to piezoelectric element 8 which results in vibrations being generated therein. These vibrations are transmitted via coupling pad 7 into the wall of the container 1. Assuming that measuring device 6 is pressed against the wall of the container at a height which is below the level of the liquid as is shown for the measuring device depicted in FIG. 1 in continuous lines, a significant portion of the vibrations propagate through liquid 4 as oscillations 12 towards the opposite side of shell 3 and as reflected oscillations 13 back towards the measuring device 6. These oscillations are transmitted back into piezoelectric element 8 where a voltage is generated. This voltage can be analyzed by control electronics 9. Depending on the characteristics of the signal, signal element 10 can display to a user the result of the measurement. A green light can for example signify that liquid is present at the level at which measuring device 6 was pressed against the outer wall of the container.

If measuring device 6 is pressed against the outer wall of the container at a level which is above surface 4*a* of liquid 4 contained in the container (as is shown by measuring device 6' depicted in dashed lines), the oscillations 14 emitted by the wall of the container at the point where measuring device 6' is applied, have to propagate through a gas. As these oscillations are significantly more dampened when propagating through gas as compared to propagation within a liquid, almost no reflected oscillations or no reflected oscillations at all will be received by measuring device 6'. Signal element 10 can then for example display with a red light that no liquid is present at the level where the measurement was taken.

The typical frequencies with which these measurements are conducted are in the ultrasonic range.

In FIGS. 2 to 5, measuring device 6 is shown in greater detail. It comprises a housing formed from an upper housing part 20 and a lower housing part 22 which are connected to each other by means of a screw 24. At a forward end of the housing, a non-tilting element 26 is provided which surrounds coupling pad 7. Non-tilting element 26 is in the form of an annular ring formed from a transparent plastic material. Signal element 10 is integrated into non-tilting element 26 so that an integral, one-piece unit made from a transparent plastics material is formed.

Coupling pad 7 is formed from a polyurethane or silicone material and is inseparably bonded to piezoelectric element 8. Piezoelectric element 8 is assembled together with coupling pad 7 into a holding sleeve 30 which is mounted so as to be displaceable in the direction of arrow P in FIG. 4. Holding sleeve 30 is provided with a spring arm 32 which abuts at a support 34 and biases holding sleeve 30 into a forward position. Further, a stop surface 36 is provided which serves at a mechanical stop for limiting a movement of holding sleeve 30 towards the interior of the housing. Still further, an electric switch 38 is provided in the interior of the housing, in particular on a printed circuit board 40, and can be actuated by pushing holding sleeve 30 in the direction of arrow P.

For coupling pad 7, a polyurethane or silicone material is used. Preferably, the temperature used for cross-linking or curing the material is below 150° C., more preferably below 120° C. This ensures that the piezoelectric properties of piezoelectric element 8 are not affected by the temperature.

Figure 6:
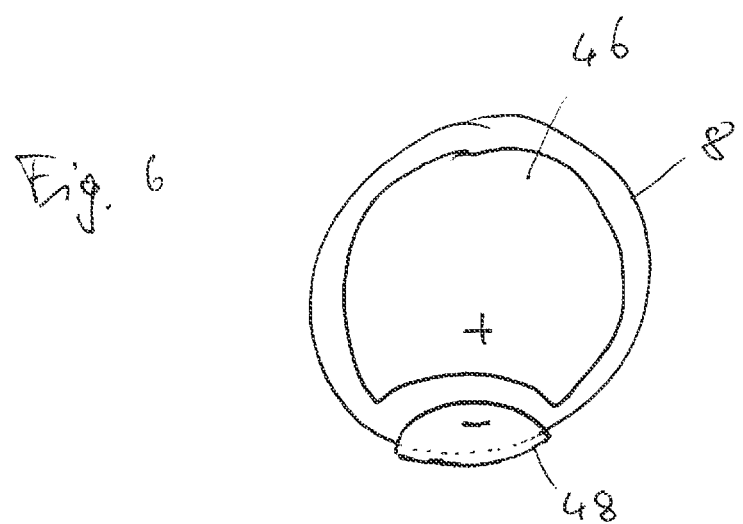
FIG. 6 shows a top view of the piezoelectric element.
Figure 7:
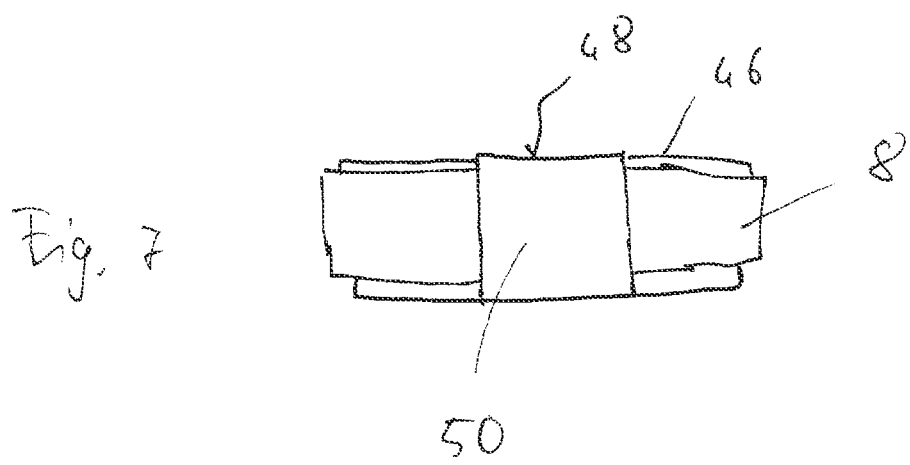
FIG. 7 shows a side view of the piezoelectric element.

A conductor foil 42 is used for electrically connecting piezoelectric element 8 to a control electronics 44 which is provided on PCB 40. Conductor foil 42 is attached to one of the larger surfaces of piezoelectric element 8, namely to the surface which faces the interior of the housing. Using only one of the sides of piezoelectric element 8 for the electrical connections is possible since piezoelectric element 8 (see in particular FIGS. 6 and 7) is provided with both contact pads 46, 48 on one of the larger surfaces. To this end, one of the electrical contacts is guided over the circumferential surface via a connecting portion 50 to the opposite side so that two contact pads 46, 48 with different polarity are formed on one and the same side of piezoelectric element 8.

The amount with which coupling pad 7 protrudes over the forward surface of non-tilting element 26 and the inward displacement necessary for switching switch 38 so as to trigger a measurement are adapted to each other such that a measurement can only be triggered if measuring device 6 is pressed against a surface in a perpendicular or at least in an almost perpendicular orientation. The allowable deviation from a perpendicular orientation is set to be approximately 5%. If the deviation is larger, the circumferential portion of non-tilting element 26 will contact the wall of the container early enough for preventing a displacement of coupling pad 7 and holding sleeve 30 in the direction of arrow P sufficient for triggering a measurement.

The result of the measurement can be displayed to a user via signal element 10. Preferably, an LED is provided on PCB 40 so as to be able to couple light into signal element 10.

Non-tilting element 26 can also be used for incorporating a flashlight function into the measuring device. A push button 52 can be used for switching the flashlight on, and a suitable LED or comparable light source is used for generating the light which is then coupled into non-tilting element 26 so as to be visible at the forward end of measuring device 6.

Figure 8:
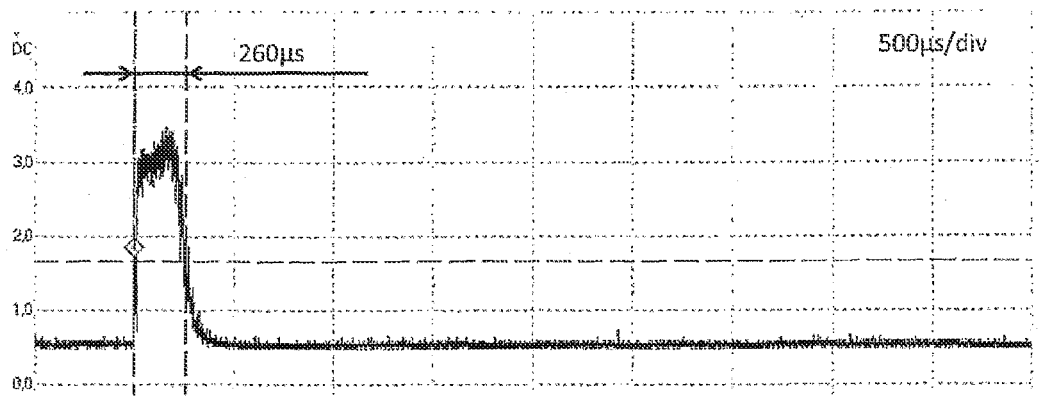
FIG. 8 shows in a diagram the voltage generated in the piezoelectric element after being excited.
Figure 9:
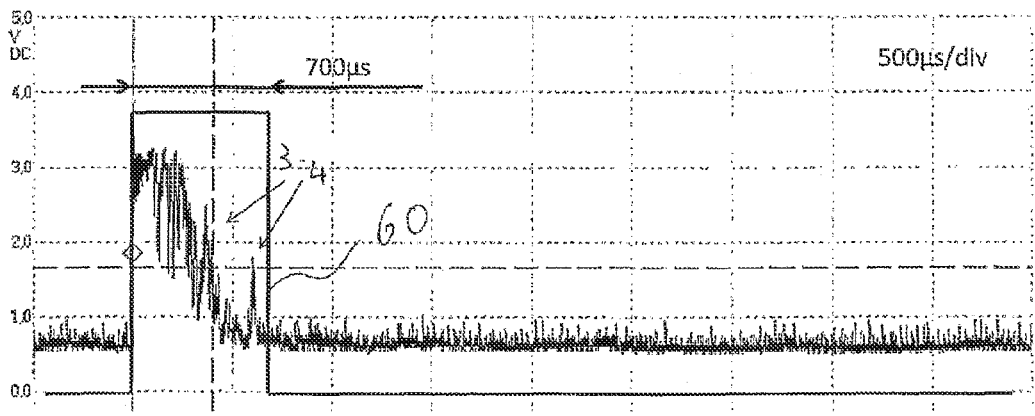
FIG. 9 shows in a diagram the voltage generated in the piezoelectric element when receiving certain echoed oscillations propagating in the shell of a container.
Figure 10:
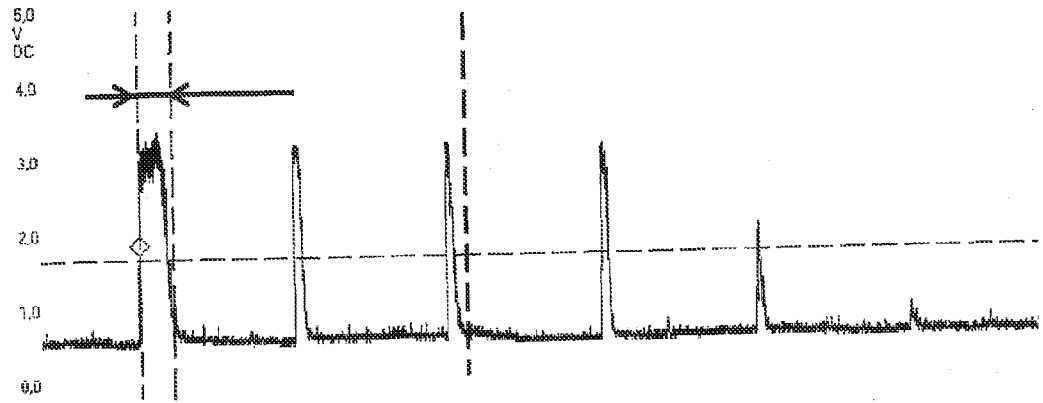
FIG. 10 shows in a diagram the voltage generated in the piezoelectric element when receiving certain reflected oscillations propagating in the liquid within a container.

In FIGS. 8 to 10, characteristic signals received from piezoelectric element 8 under certain conditions are shown. After being excited by control electronics 44, a piezoelectric element not subjected to a particular damping effect will continue to vibrate for approximately 300 to 400 microseconds. In view of the typical propagation periods for certain oscillations within a container to be measured, this is a problem. The oscillations of the first type which propagate within the wall of the container, will return as an echo to the measuring device within approximately 130 microseconds if gas is present in the respective section of the container. Accordingly, it is hardly possible to distinguish between the post-pulse oscillations of the piezoelectric element after being excited, and the oscillations echoed within the wall of the container.

The situation improves only slightly if the piezoelectric element is excited when being pressed against coupling pad 7 which in turn is pressed against the wall of the container. Even though the coupling pad exerts a dampening effect on the piezoelectric element, the post-pulse oscillations have a duration of approximately 250 to 260 microseconds, as can be seen in FIG. 8. In FIG. 8, the voltage measured across the piezoelectric element after being excited is shown. Due to the post-pulse oscillations, a voltage of approximately 3 volts can be measured for approximately 250 microseconds.

FIG. 9 shows the voltage which can be seen for a situation in which the measuring device is applied above the upper surface for the liquid. As the oscillations propagating in the shell of container 1 are hardly damped in this section, a third and a fourth echo (marked in FIG. 9 with "3" and "4") of the original oscillations can be clearly seen in the voltage signal. The first and the second echoes are part of the post-pulse oscillations and can therefore not be clearly detected. The presence of the third and fourth echoes is a clear indication that the measurement was made above the level of liquid within the container. If the measurement was made below the level of liquid, no third and fourth echoes could be detected as the liquid present within the respective section of the shell would dampen the oscillations such that no echoes would arrive at the piezoelectric element. Then, the post-pulse oscillations of the piezoelectric element would cease to exist after approx. 260 microseconds.

The echoes of the oscillations propagating within the shell of the container can be detected by using a low-pass filter having a time constant of the propagation time of the oscillations travelling within the shell of the container. The signal of such low-pass filter is shown in FIG. 9 with bold line 60. In a condition in which electric switch 38 confirms that holding sleeve 30 is pressed inwardly such that there must be a dampening effect on piezoelectric element 8, and further the duration of post-pulse oscillations of piezoelectric element 8 is extended over the "normal" period of time of approximately 250 microseconds to a time period of for example 700 microseconds due to the echoes of the oscillations in the shell received by the piezoelectric element, control electronics 44 can assume that the measurement was made above the level of liquid within the container.

If the measurement was made at a height which is below the level of the liquid within the container, the post-pulse oscillations of the piezoelectric element would quickly disappear as the pressure from coupling pad 7 results in a damping effect. Subsequently, no echoes transmitted within the shell of the container are received at the measuring device since the liquid present within the respective section of the shell dampens such oscillations. However, with a delay of approximately 800 microseconds, the reflections of oscillations propagating within the liquid towards the opposite side of the shell (please see symbolized propagation 12 and reflection 13 in FIG. 1) are received at piezoelectric element 8. This is schematically shown in FIG. 10.

If the measurement is made slightly above the level of the liquid within the container, part of the vibrations will enter into the liquid, propagate within the liquid and be reflected from the opposite side of the shell. Such reflection will be received by piezoelectric element 8 and generate a voltage therein. The oscillations propagating within the shell of the container have however resulted in a couple of echoes which are received by piezoelectric element 8 and which will result in a voltage signal similar to extended post-pulse oscillations within piezoelectric element 8. Accordingly, control electronics 44 can clearly see that the measurement must have been made above the level of liquid within the container, even if reflections of oscillations having propagated to a large extent within the liquid are being received. This allows the control electronics to clearly distinguish between a measurement made above the level of the liquid and below the level of the liquid.

The invention claimed is:

1. A device for measuring the level of a liquid within a container, in particular the level of liquid gas, comprising a housing, a piezoelectric element adapted for generating vibrations when energized, a coupling pad bonded to the piezoelectric element for transmitting the vibrations to a surface of the container, and a non-tilting element which surrounds the coupling pad, the device being a handheld device wherein the coupling pad is mounted displaceably in the housing and cooperates with an electric switch for automatically triggering a measurement when said device is being pressed against a container, said coupling pad protruding over a forward surface of said non-tilting element such that a measurement can only be triggered when said measuring device is pressed against a surface of said container in an orientation which is generally perpendicular to said surface.

2. The device of claim 1 wherein the coupling pad and the piezoelectric element are mounted in a holder such that a prefabricated unit is formed.

3. The device of claim 2 wherein the prefabricated unit is mounted displaceably in the housing and cooperates with an electric switch for triggering a measurement.

4. The device of claim 2 wherein a mechanical stop is provided which limits the maximum displacement of the prefabricated unit.

5. The device of claim 2 wherein the prefabricated unit comprises a holding sleeve which accommodates the piezoelectric element and holds the coupling pad such that an edge portion of the coupling pad is mechanically connected to the holding sleeve at the end of the holding sleeve which is opposite the piezoelectric element.

6. The device of claim 2 wherein the prefabricated unit forming a preassembled assembly with the non-tilting element.

7. The device of claim 1 wherein the coupling pad is chemically bonded to the piezoelectric element such that an inseparable connection is formed.

8. The device of claim 1 wherein the coupling pad is formed from polyurethane.

9. The device of claim 8 wherein an activator is used for applying the polyurethane to the piezoelectric element.

10. The device of claim 1 wherein the coupling pad is formed from silicone.

11. The device of claim 10 wherein a polymeric primer is used for applying the silicone to the piezoelectric element.

12. The device of claim 10 wherein the silicone has a cross-linking temperature which is below 150° C.

13. The device of claim 1 wherein a measuring electronics are used for evaluating a measuring signal obtained from the piezoelectric element.

14. The device of claim 13 wherein the measuring electronics are provided with a low pass filter.

15. The device of claim 13 wherein a low-pass filter is implemented in software of the device.

16. The device of claim 1 wherein the non-tilting element is formed in one piece with a signal element for displaying the result of the measurement.

17. The device of claim 16 wherein the non-tilting element is formed from a transparent plastics material.

18. The device of claim 16 wherein the piezoelectric element comprises two electrical contacts at the same surface.

19. The device of claim 18 wherein a conductor foil comprising a substrate foil carrying conducting traces, the conductive foil is used for contacting the piezoelectric element.

* * * * *